Aug. 20, 1929.　　　S. A. JEFFRIES　　　1,725,142
TRANSMISSION
Filed Dec. 22, 1924　　　2 Sheets-Sheet 1

INVENTOR.
Schuyler A. Jeffries
BY Whittemore Hulbert
Whittemore & Belknap
ATTORNEYS

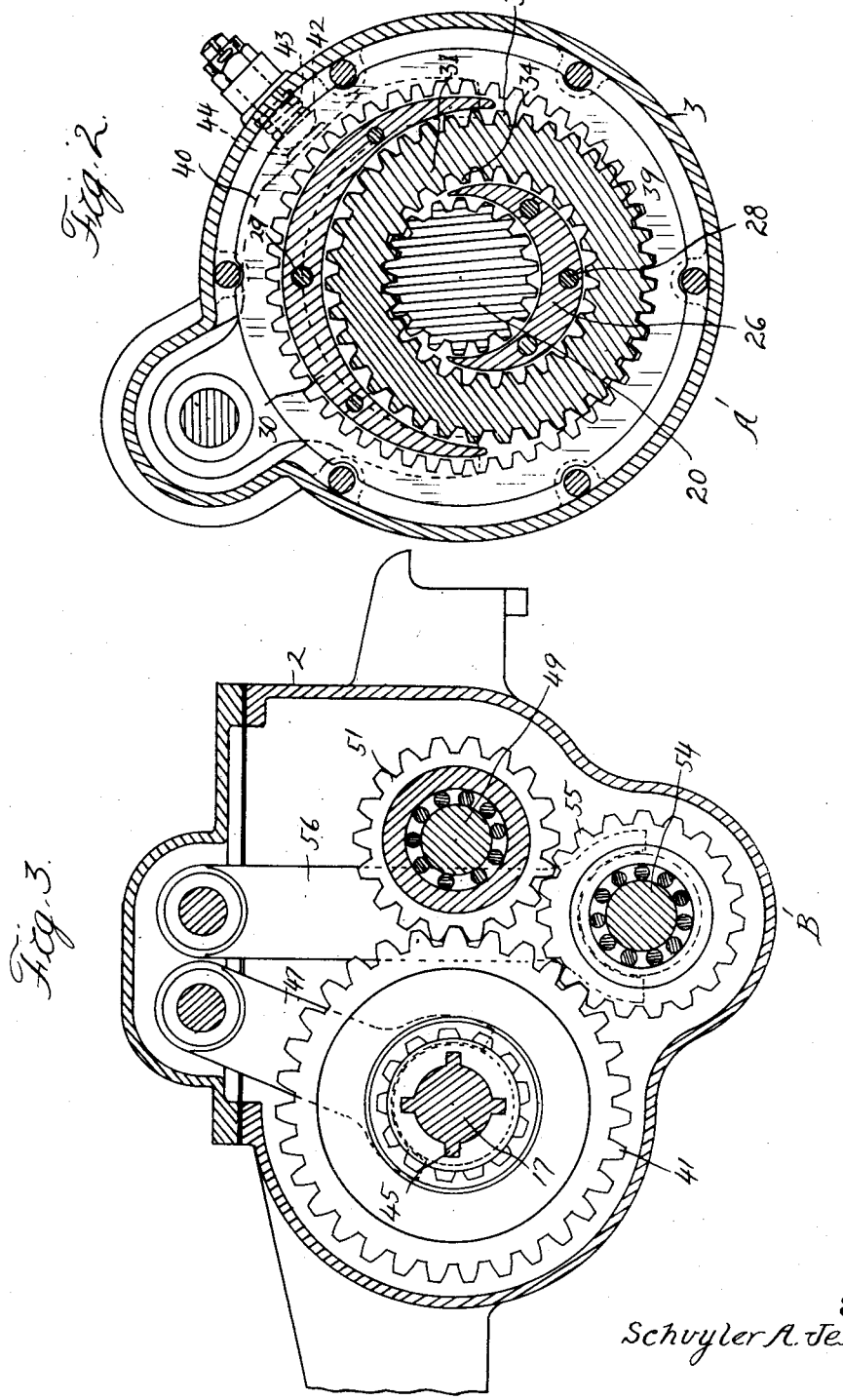

Patented Aug. 20, 1929.

1,725,142

UNITED STATES PATENT OFFICE.

SCHUYLER A. JEFFRIES, OF LANSING, MICHIGAN, ASSIGNOR TO REO MOTOR CAR COMPANY, OF LANSING, MICHIGAN, A CORPORATION OF MICHIGAN.

TRANSMISSION.

Application filed December 22, 1924. Serial No. 757,517.

The invention relates to transmission mechanisms adaptable for use in motor vehicles. The object is to provide a mechanism of the selective gear type having a series of forward and reverse speeds of different ratio.

The invention consists in the novel arrangements and combinations of parts as hereinafter more fully described.

In the drawings:

Figure 1 is a longitudinal section through the transmission;

Figure 3 is another transverse section taken on the line 3—3 of Figure 1.

Figure 2:
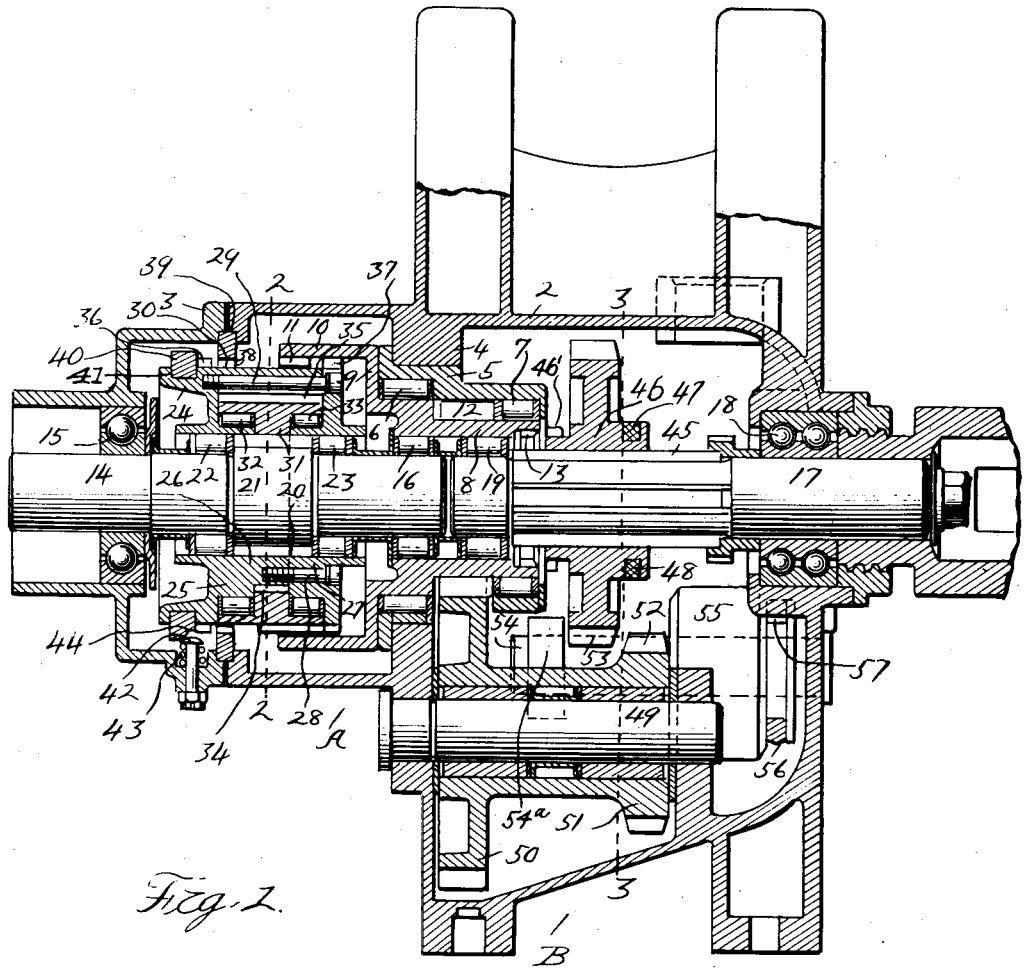
Figure 2 is a transverse section on the line 2—2 of Figure 1.

My improved transmission is provided with four forward speeds of different ratios and two reverse speeds and is composed essentially of two units, A and B, the first unit containing an arrangement permitting either a direct drive or a forward drive at reduced speed and the second unit being arranged to provide a direct connection, a forward gear drive and a reverse gear drive. The unit B is preferably controlled by one control lever while unit A is actuated through a separate control lever. Both units are preferably mounted in a transmission case and so arranged as to constitute a single transmission mechanism having a driving shaft at one end thereof and a driven shaft at the other end.

The transmission case 1 is preferably made up in two pieces, the rear housing 2 and the forward housing 3. At the forward end of the rear housing there is an inwardly projecting portion of the casing designated as 4 in which is inserted a bushing 5 for receiving the annular roller bearings 6 and 7 respectively, these bearings supporting the central rotatable member 8. The member 8 is provided at its forward end with a radial flange 9 having the longitudinally projecting annular flange 10 connected thereto, the latter being provided with internal gear teeth 11. The member 8 also has formed thereon preferably intermediate the bearings 6 and 7, the external gear teeth 12 and at its rear end is provided with the internal clutch teeth 13.

14 is the driving shaft of the transmission journaled in the ball bearings 15 at the front end of the transmission case and extending through the forward housing 3 and having the rear end thereof journaled in the roller bearings 16 arranged in the hollow interior of the rotatable member 8. 17 is the driven shaft journaled in the ball bearings 18 in the rear of the transmission case and extending through the rear housing 2 in axial alignment with the driving shaft 14 and having its forward end journaled in the roller bearings 19 also arranged within the hollow interior of the rotatable member 8.

The driving shaft 14 has external teeth 20 thereon forming a drive pinion 21 and on each side there are the roller bearings 22 and 23 respectively for rotatably mounting the member 24 which has formed thereon the eccentric 25. The member 24 is preferably made up of two parts 26 and 27 secured together by the screws 28 and 29, the latter serving also to secure a counterweight 30 to the member 24 in such a position to balance the weight of the eccentric portion 25. 31 is the eccentric gear rotatably mounted on the eccentric portion of the member 24 by the roller bearings 32 and 33 and having formed on its inner periphery the internal gear teeth 34 and having also the external gear teeth 35. The internal teeth of the eccentric gear 31 mesh with the teeth 20 of the pinion 21 while the external teeth 35 are arranged to mesh with the internal teeth 11 of the annular flange 10 at a point diametrically opposite from the point of meshing with the internal teeth 34. Thus, if the eccentric member 24 is held from rotative movement the driving of the pinion 21 will rotate the annular flange 11 at reduced speed through the eccentric gear 31.

On the periphery of the eccentric member 24 there are arranged at opposite ends thereof the clutch teeth 36 and 37, the former being preferably formed integral with the end flange 26 and the latter integral with the other end flange 27. The teeth 37 are adapted to mesh with the internal teeth 11 while the teeth 36 are adapted to mesh with corresponding teeth 38 on a fixed ring 39 secured to the transmission housing 3. 40 is a shifting fork engaging a recess 41 in the eccentric member 24 and adapted to shift said member longitudinally upon the roller bearings 22 and 23 while maintaining at all times the engagement of the pinion 21 with the eccentric gear 31. When the eccentric 24 is in the rearward position the clutch teeth 36 engage the clutch teeth 38 and thus lock the eccentric member 24 to the transmission case, thereby preventing any rotation. On the other hand, when the eccentric 24 is moved forwardly the external teeth 37 engage the internal teeth 11 thereby coupling the eccentric 24 to the rotatable member 8 and in this position the eccentric 24, eccentric 31 and rotatable member 8 all rotate as a unit and form a direct drive.

In order to stop rotation of the eccentric 24 before the same is clutched to the ring 39, a braking mechanism is provided comprising the brake shoe 42 extending radially inward of the transmission case. This brake shoe is urged inwardly by the coil spring 43 and engages with the cam surface 44 on the shifting fork 40. This fork is allowed to rotate on its shaft so the clearance between 40 and 25 is taken up when the shifting fork 40 is moved rearwardly. Thus the brake shoe 42 engaging the cam 44 stops the rotation of the eccentric 24 before engaging the clutch teeth 36 with the fixed clutch teeth 38.

The driven shaft 17 is provided with splines 45 on which is slidably mounted a spur gear 46 having external clutch teeth 46' thereon adapted to engage the internal clutch teeth 13 when the gear is in the forward position. 47 is the shifting fork engaging a recess 48 in the hub of the gear 46 and serving to move said gear longitudinally on the splines. 49 is a countershaft parallel to the driven shaft 17 and having rotatably mounted thereon the spur gear 50 constantly meshing with the gear teeth 12. 51 is another gear mounted on the countershaft and preferably formed integral with the gear 50, this latter gear having the teeth 52 adapted to mesh with the teeth 53 on the gear 46 when the latter is moved rearwardly on the splines of the driven shaft. There is also provided a stub shaft 54 in a bearing 54ª, said shaft having a reverse idler gear 55 rotatably mounted thereon adapted to simultaneously engage the gears 51 and 46 when shifted into its forward position. For actuating the reverse idler gear there is a shifting fork 56 engaging the recess 57 in the hub of the idler gear.

In the transmission as described above, the units A and B are preferably controlled by separate shifting levers and by suitably arranging the levers there are available six different speeds, four forward and two reverse. The direct drive is obtained when the eccentric 24 is clutched to the member 8, this being the forward portion of the eccentric with the external teeth 37 engaging internal teeth 11. The gear 46 is also in the forward position, thus directly connecting the member 8 with the driven shaft 17 by the engagement of internal clutch teeth 13 with the external clutch teeth 36.

The second speed of the transmission is obtained by leaving the gear 46 directly coupled to the member 8 and moving the eccentric rearwardly to disengage the same from the clutch teeth 11 and couple it to the fixed ring 39. With this arrangement a reduction is obtained by reason of the fact that the drive goes through the eccentric gear 31.

The third forward speed is obtained by shifting the gear 46 into engagement with the gear 51, thus driving the driven shaft 17 by means of the constant meshed gears 12 and 50 and the change gears 51 and 46. For the third speed the unit A again has the eccentric 24 coupled to the member 8 while for the fourth speed, the eccentric is coupled to the fixed ring 39.

The reverse speeds are obtained by shifting a reverse idler gear 55 into simultaneous engagement with gears 46 and 51, thus rotating the driven shaft 17 oppositely to the driving shaft 14. Two reverse gear ratios are possible, one when the unit A is clutched in one position and the other when said unit is arranged in the other position.

What I claim as my invention is:—

1. A transmission comprising a transmission casing having a rotatable member centrally journaled therein, a splined shaft journaled at one end within said rotatable member and at the other end in said casing, a second shaft in axial alignment with said splined shaft, also having one end journaled within said rotatable member, a countershaft, a gear on said countershaft meshing with teeth on said rotatable member, a longitudinally slidable gear on said main shaft having clutch teeth thereon, corresponding clutch teeth on said rotatable member, a gear on said countershaft driven by said constant mesh gear, a reverse idler gear longitudinally slidable to engage the gear on said main shaft and the gear on said countershaft, internal gear teeth on said rotatable member, external gear teeth on said second shaft, an eccentric rotatable on said second shaft, an eccentric gear journaled on said eccentric and having internal and external gear teeth adapted to mesh respectively with the gear on said second shaft and said internal gear, means for longitudinally shifting said eccentric, clutch teeth on said eccentric, clutch teeth on said transmission casing adapted to engage the teeth on said eccentric adapted to mesh with said eccentric gears.

2. A transmission comprising a transmission casing, a rotatable member journaled in said casing having internal gear teeth at one end thereof and clutch teeth at the opposite end thereof and being formed integral with a constant mesh gear, a splined main shaft having one end thereof journaled within said rotatable member, a pinion shaft axially aligned with said splined shaft and having one end also journaled in said rotatable member, an eccentric rotatably mounted on said pinion shaft, an eccentric gear surrounding said pinion shaft and journaled on said eccentric, said eccentric gear being provided with external teeth meshing with the internal teeth on said rotatable member and provided with internal teeth meshing with the pinion on said pinion shaft, means for longitudinally moving said eccentric, clutch teeth on said transmission casing engagable with said eccentric, and clutch teeth on said eccentric engagable with said internal gearing, a countershaft, a gear on said countershaft meshing with said constant mesh gear, a gear slidable on said main shaft and adapted to alternatively engage the clutch teeth on said rotatable member and the gear on said countershaft, and a reverse idler pinion longitudinally movable to simultaneously engage said gears on said main shaft and countershaft.

In testimony whereof I affix my signature.

SCHUYLER A. JEFFRIES.